(12) United States Patent
Reyes

(10) Patent No.: US 8,226,103 B2
(45) Date of Patent: Jul. 24, 2012

(54) SYSTEM AND METHODS FOR A FRONT WHEEL DRIVE BICYCLE

(76) Inventor: Rodolfo (Rudy) Reyes, Katy, TX (US)

( * ) Notice: Subject to any disclaimer, the term of this patent is extended or adjusted under 35 U.S.C. 154(b) by 0 days.

(21) Appl. No.: 12/664,622

(22) PCT Filed: Jun. 13, 2008

(86) PCT No.: PCT/US2008/067030
§ 371 (c)(1),
(2), (4) Date: Apr. 20, 2010

(87) PCT Pub. No.: WO2008/157439
PCT Pub. Date: Dec. 24, 2008

(65) Prior Publication Data
US 2010/0300789 A1    Dec. 2, 2010

Related U.S. Application Data

(60) Provisional application No. 60/943,713, filed on Jun. 13, 2007.

(51) Int. Cl.
*B62K 19/00* (2006.01)

(52) U.S. Cl. .................... 280/281.1; 280/288.1; 280/261

(58) Field of Classification Search .................. 180/207; 280/288.3, 274, 256, 257, 259, 261, 288.1, 280/281.1, 282, 279; 74/416, 417, 393, 395
See application file for complete search history.

(56) References Cited

U.S. PATENT DOCUMENTS

| | | | | |
|---|---|---|---|---|
| 3,118,514 A | * | 1/1964 | Bowman | 180/224 |
| 3,193,305 A | | 7/1965 | Hendricks | |
| 3,511,521 A | * | 5/1970 | Gobini | 280/270 |
| 3,540,309 A | | 11/1970 | Shimano | |
| 4,070,032 A | * | 1/1978 | Cunningham | 280/231 |
| 4,099,737 A | | 7/1978 | Waugh | |
| 4,147,370 A | | 4/1979 | Lindsey | |
| 4,397,369 A | * | 8/1983 | Read | 180/205 |
| 4,479,660 A | * | 10/1984 | Pattison | 280/261 |
| 4,611,684 A | * | 9/1986 | Geschwender | 180/223 |
| 4,773,662 A | | 9/1988 | Phillips | |
| 4,895,385 A | | 1/1990 | Becoat | |
| 4,909,529 A | | 3/1990 | Maguire | |
| 5,054,572 A | * | 10/1991 | Parker | 180/224 |
| 5,054,801 A | | 10/1991 | Maguire | |

(Continued)

FOREIGN PATENT DOCUMENTS

FR    2574744    6/1986

(Continued)

*Primary Examiner* — Tashiana Adams
(74) *Attorney, Agent, or Firm* — Krueger Iselin LLP

(57) ABSTRACT

Front wheel drive vehicles, bicycles or motorized scooters, include an enclosed drive belt connected to provide power to the front wheel through a chain, where the vehicle is steered by way of a front fork extending outside and over the head tube of the frame, and methods of use thereof. Movable linkages, which may be belts, chains, or other linkages, provide power generated using pedals or a motor to the front wheel. The belts are preferably enclosed within the frame or the front fork to prevent interference or damage. A chain is preferably used to drive the front wheel. Having the front fork outside the head tube allows for the head tube to route the linkage from the frame to the front fork without interference by the steering connection to the front wheel, allowing for a full range of motion of the front wheel.

19 Claims, 11 Drawing Sheets

U.S. PATENT DOCUMENTS

| | | | |
|---|---|---|---|
| 5,069,469 A * | 12/1991 | Rosengrant et al. | 280/288.1 |
| 5,078,416 A | 1/1992 | Keyes | |
| 5,113,964 A * | 5/1992 | Yamauchi | 180/224 |
| 5,116,070 A | 5/1992 | Becoat | |
| 5,158,314 A | 10/1992 | Farras Pinos | |
| 5,224,725 A | 7/1993 | Erlston | |
| 5,324,057 A | 6/1994 | Chartrand | |
| 5,332,244 A | 7/1994 | Turner et al. | |
| 5,486,015 A * | 1/1996 | Lau | 280/236 |
| 5,542,689 A | 8/1996 | Chalfant | |
| 5,788,254 A * | 8/1998 | Davis | 280/282 |
| 5,873,590 A * | 2/1999 | Abe et al. | 280/259 |
| 6,068,279 A | 5/2000 | Dion | |
| 6,099,009 A | 8/2000 | Schroeder | |
| 6,161,854 A | 12/2000 | Christini et al. | |
| 6,161,855 A * | 12/2000 | Christini et al. | 280/230 |
| 6,182,991 B1 | 2/2001 | Christini et al. | |
| 6,439,592 B1 | 8/2002 | Christini et al. | |
| 6,446,985 B1 * | 9/2002 | Tompsett | 280/30 |
| 6,530,589 B1 * | 3/2003 | Ma | 280/278 |
| 6,588,786 B2 | 7/2003 | Efflandt, Sr. | |
| 6,827,362 B2 * | 12/2004 | Smith et al. | 280/230 |
| 6,986,520 B2 | 1/2006 | Smith et al. | |
| 7,097,190 B2 * | 8/2006 | Matsumoto et al. | 280/281.1 |
| 7,188,853 B2 * | 3/2007 | Yen | 280/288.1 |
| 7,487,854 B2 * | 2/2009 | Christini et al. | 180/224 |
| 7,950,682 B2 * | 5/2011 | Despins | 280/288.1 |
| 2003/0213631 A1 * | 11/2003 | Schless | 180/220 |
| 2004/0089489 A1 * | 5/2004 | Schless | 180/220 |
| 2006/0237945 A1 | 10/2006 | Hauer | |
| 2010/0206652 A1 * | 8/2010 | Kielland | 180/220 |

FOREIGN PATENT DOCUMENTS

| | | |
|---|---|---|
| FR | 2623157 | 5/1989 |

* cited by examiner

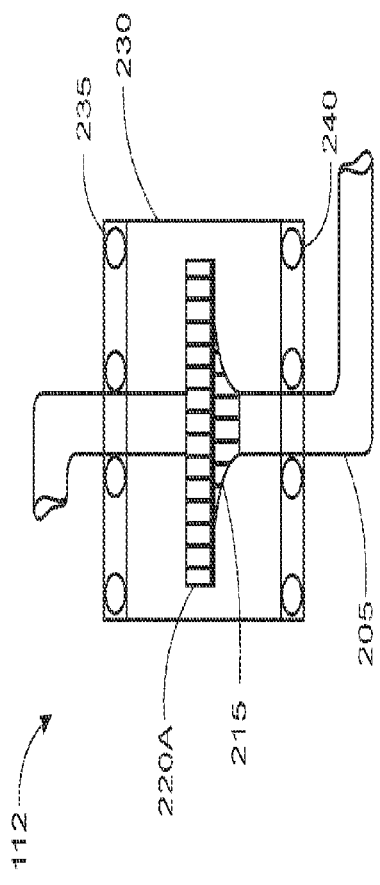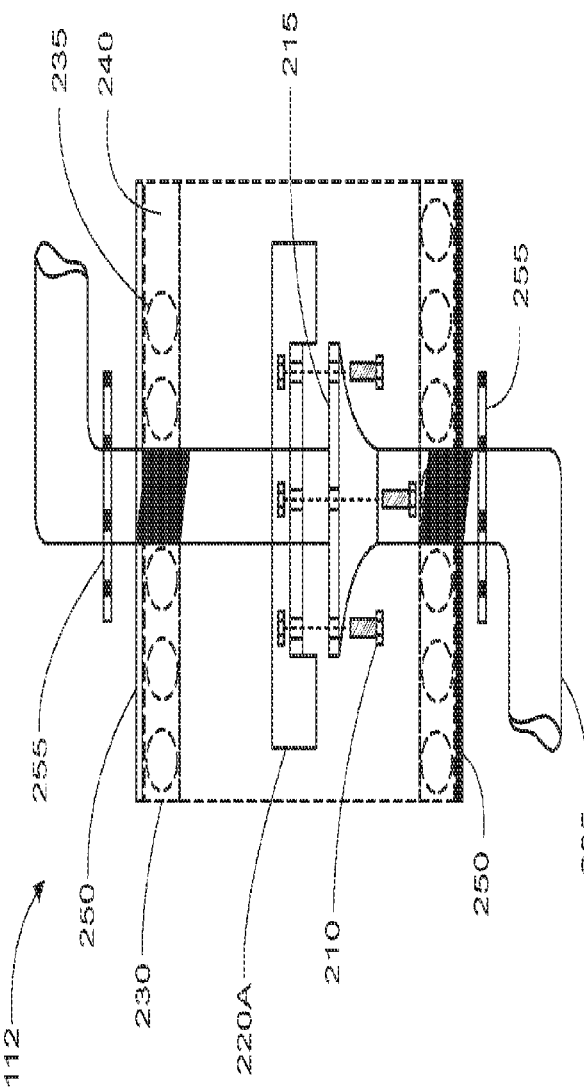

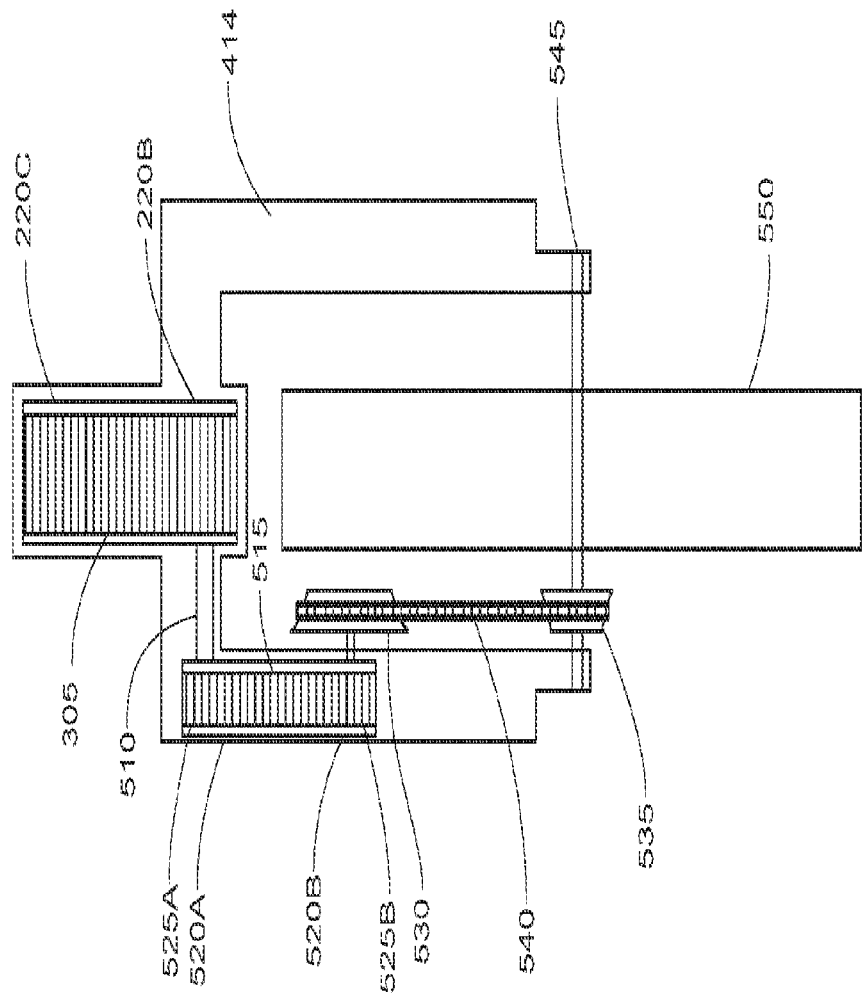

SYSTEM AND METHODS FOR A FRONT WHEEL DRIVE BICYCLE

RELATED APPLICATIONS

The present application is a 35 USC §371 national stage application of International Application PCT/US2008/067030, which claims priority to Provisional U.S. Patent Application 60/943,713, entitled "Front Wheel Belt Driven Bicycle" and filed Jun. 13, 2007, which is incorporated by reference in its entirety.

BACKGROUND

Modern bicycles may be an efficient way for riders to travel, both for leisure and to commute in urban areas, on hard surfaces. Off-road riding has improved over time, with wider tires and stronger frames being added. The need for better traction has seen some movement towards front wheel drive and all wheel drive bicycles, but the problems with both continue to hamper the market.

In U.S. Pat. No. 4,479,660, Pattison discloses a two wheel drive bicycle that is belt driven to both front and rear wheels. Besides the known problems with maintaining even power distribution to both wheels, the belts are exposed belts, and the belt to the front wheel does not appear to allow for a full range of motion for proper steering.

In U.S. Pat. No. 6,161,855, Christini et disclose a two wheel drive bicycle that appears to provide an enlarged and elongated frame to enclose only partially a drive mechanism driven off the rear wheel to provide driving force to the from wheel. Christini et al. appears to disclose a traditional front fork attached to the frame through the head tube.

In U.S. Pat. No. 6,588,786, Efflandt discloses a front wheel drive bicycle that is steered with the rear wheel. Known problems with the exposed chain are still present, as is the novelty of having to relearn to ride a bicycle steering with the opposite wheel.

What is needed is an efficient front wheel drive bicycle that provides with full range steering.

BRIEF DESCRIPTION OF THE DRAWINGS

A better understanding of the various disclosed embodiments can be obtained when the following detailed description is considered in conjunction with the following drawings, in which:

FIG. 2A is an illustrative embodiment of a driving mechanism, and FIG. 2B is an exploded view of FIG. 2A;

FIG. 5 shows an embodiment of front wheel drive system including two belts and a chain;

Figure 1A:
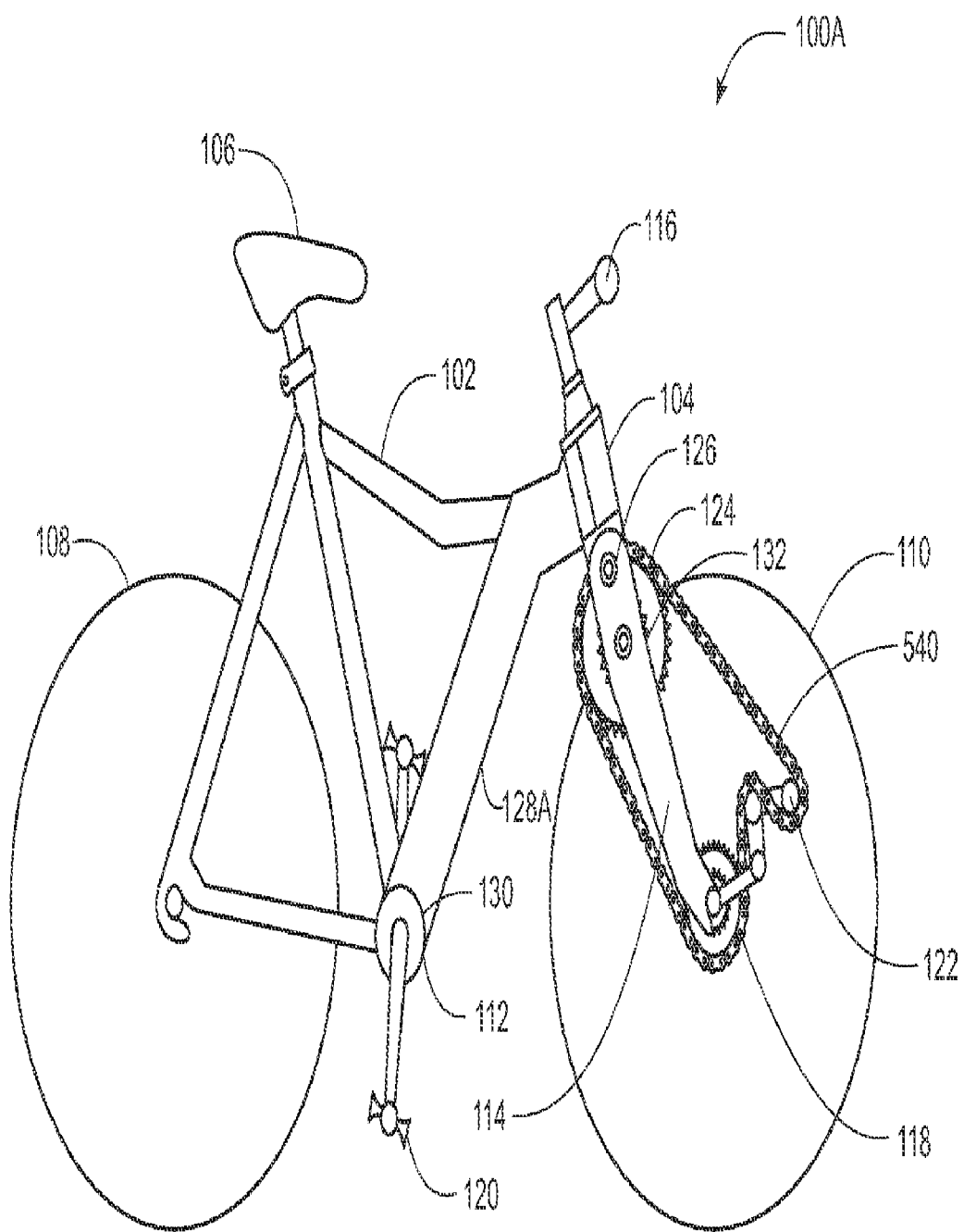
FIGS. 1A and 1B are illustrative front wheel drive bicycles according to embodiments of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular illustrated embodiments, but on the contrary, the intention is to cover all modifications, equivalents and alternatives falling within the spirit and scope of the present invention as defined by the appended claims.

DETAILED DESCRIPTION

Accordingly, there are disclosed herein various embodiments of front wheel drive vehicles, bicycles or motorized scooter, including an enclosed drive belt connected to provide power to the front wheel through a chain, where the bicycle is steered by way of a front fork extending outside and over the head tube of the frame, and methods of use thereof. In various embodiments, movable linkages, which may be belts, chains, or other linkages, provide power generated using pedals or a motor to the front wheel. The belts are preferably enclosed within the frame or the front fork to prevent interference or damage. A chain is preferably used to drive the front wheel. Having the front fork outside the head tube allows for the head tube to route the linkage from the frame to the front fork without interference by the steering connection to the front wheel, allowing for a full range of motion of the front wheel.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

Figure 1B:
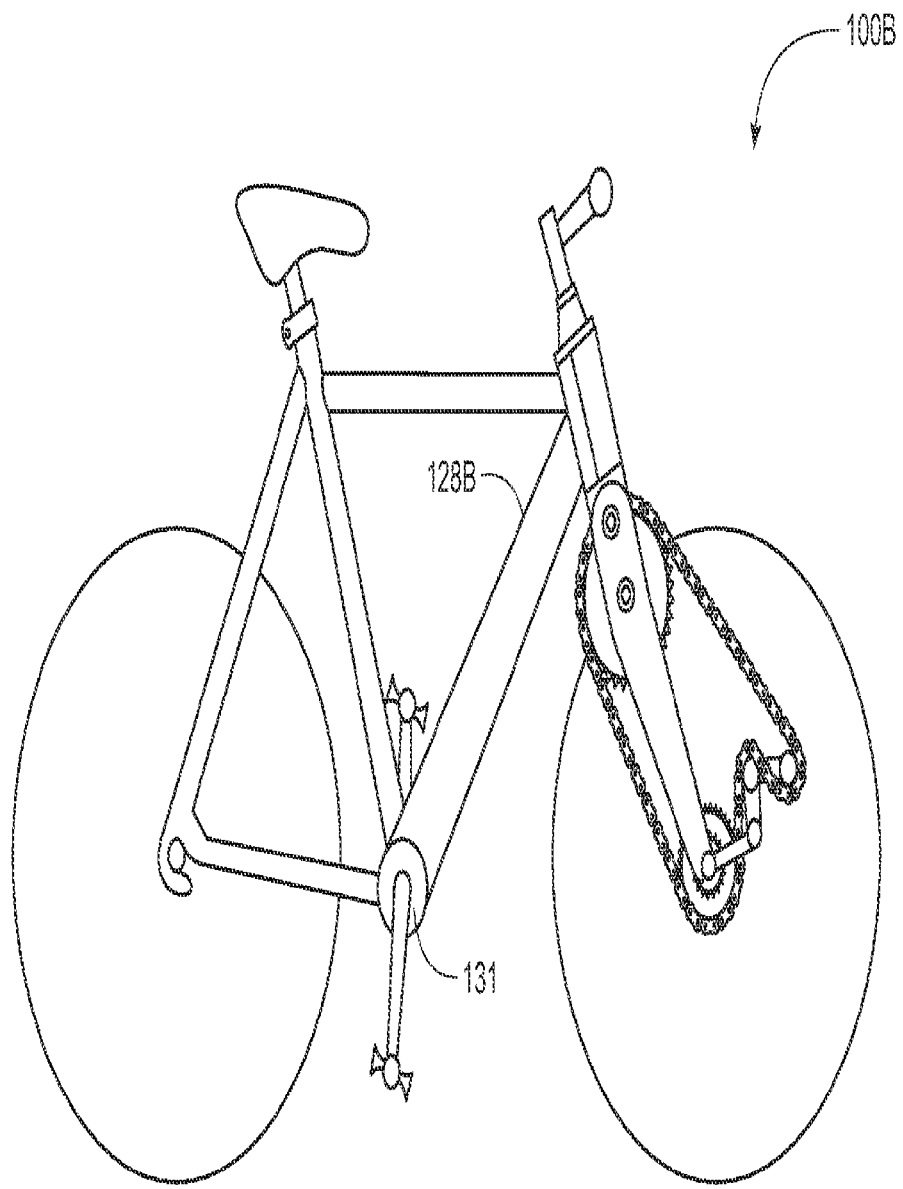

The disclosed systems and methods are best understood in the context of embodiments of bicycles 100A and 100B as shown in FIGS. 1A and 1B. As shown in FIG. 1A, the bicycle 100A includes a frame 102 providing structural support for other parts. Selected portions of the frame 102 include a head tube 104, which is near a front wheel 110, and a body tube 128A. A front fork 114 is connected to the frame 102 at the head tube 104. Handle bars 116 are connected to the front fork 114 as is a front wheel 110, as is well known in the art. A rear wheel 108 is coupled to the frame 102 near the seat 106. A driving mechanism 112 is shown with crank pedals 120 coupled to a crank tube 130.

As will be discussed in more detail later, in various embodiments, a belt drive system, partially or fully enclosed within the frame 102 and/or the front fork 114, drives a chain drive system to provide power to the front wheel 110. In FIG. 1A, a drive belt 305 (not shown, shown in FIG. 3A) inside the body tube 128A may be placed in motion through the action of the crank pedals 120. The motion of the drive belt 305 imparts motion to a transfer belt 515 (not shown, shown in FIG. 3A). A rotation axis 126 for a belt sprocket for the transfer belt is shown in FIG. 1A. The rotation axis for the other belt sprocket for the transfer belt is substantially co-linear with the rotation axis for an upper chain sprocket 132. The motion of the transfer belt 515 imparts motion to the chain 540 through a swivel drive shaft 510, turning the front wheel 110. Derailleur mechanisms 122 and 124 are shown connected to the chain 540 to allow for changing gear ratios, or "gears," as is known in the art.

Coaxial with the front wheel 110 is a lower chain sprocket 118, typically coupled to a drivable wheel hub (not shown), as is known in the art. As shown, the rear wheel 108 couples to a free wheel hub (not shown), as is known in the art. Where in a typical bicycle, the front wheel is free, while the rear wheel is driven, as shown, the front wheel 110 is driven and the rear wheel 108 is free.

The bicycle 100B of FIG. 1B is similar to the bicycle 100A of FIG. 1B except for the straight body tube 128B. As shown in FIG. 1A, the body tube 128A has a bend towards the front wheel 110. The straight body tube 128B does not have the bend. Additional details concerning the body tube 128A and the straight body tube 128B are shown with respect to FIGS. 3A and 3B.

Turning now to FIGS. 2A and 2B, details of the driving mechanism 112 are shown. In the embodiment shown, in FIG. 2A, crank arms 205, extending from the crank pedals 120 (shown in FIGS. 1A and 1B) may be used to rotate a drive belt sprocket 220A. The drive belt sprocket 220A is held in contact with the crank arms 205 by a bracket 215. Bearings 235 and a bearing cup 240 may advantageously aid in decreasing friction in the rotation of the crank arms 205, as the pressure plate 250, held in place by flat screws 255, act as a wall and rotate along with the pedals 120 an the crank arms 205.

In FIG. 2B, the exploded view of FIG. 2A, the bracket 215 is shown attached to the crank arms 205 using bolts 210, which connect to the drive belt sprocket 220A, preferable holding the drive belt sprocket 220A tightly to the crank arms 205 preventing differences in rotation between them.

Figure 3A:
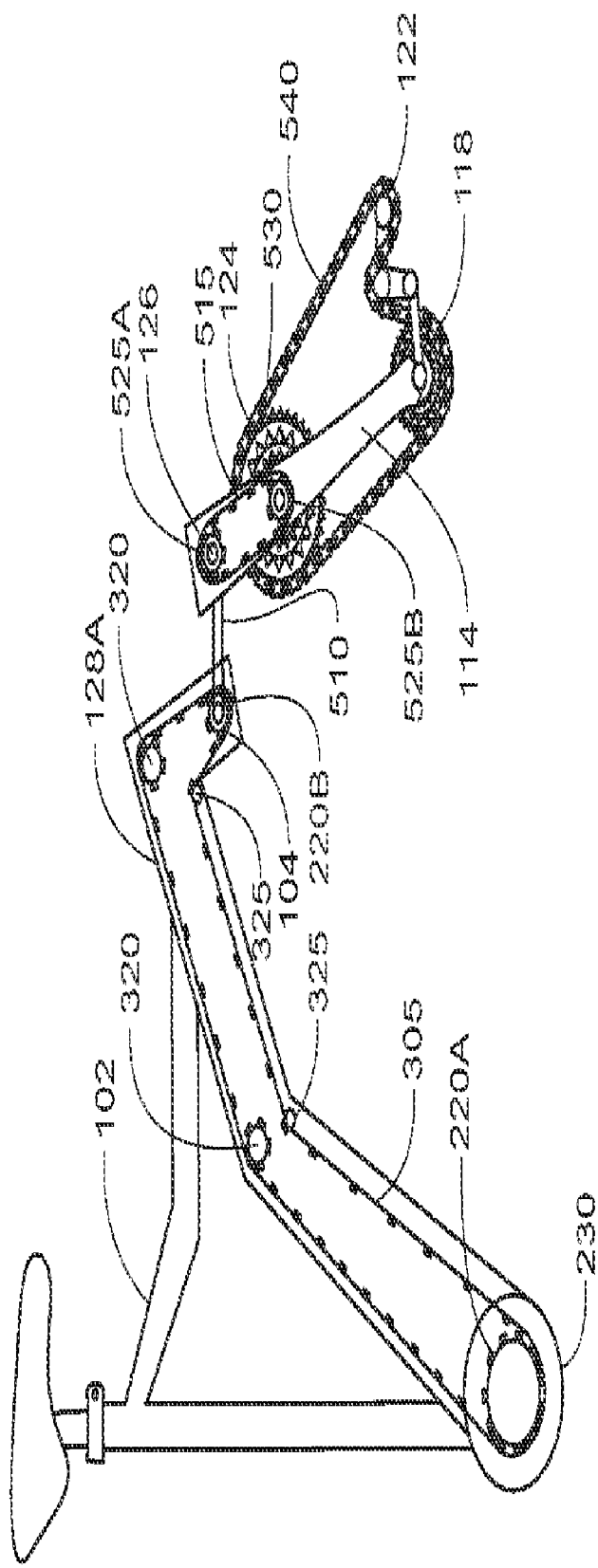
FIG. 3A is an illustrative diagram of one embodiment of how power is provided to the front wheel, showing how the drive belt circulates through the body tube.

Turning now to FIG. 3A, one embodiment of the belt drive mechanism and chain drive mechanism is shown. The frame 102 substantially encloses the drive belt 305 inside the body tube 128A and the head tube 104. The drive belt 305 circulates around the drive belt sprocket 220A, two belt guide sprockets 320, a driven belt sprocket 220B, and over two belt pulleys 325. Rotation of the driven belt sprocket 220B provides rotation of the upper transfer belt sprocket 525A, through the swivel drive shaft 510.

As shown, in this embodiment, transfer belt 515 circulates between the upper belt sprocket 525A and a lower transfer belt sprocket 525B. As is known in the art, the derailleur mechanism 124 regulates the rotational interaction between the chain 540 and the lower transfer belt sprocket 525B through the coaxial upper chain sprocket 530.

Figure 3B:
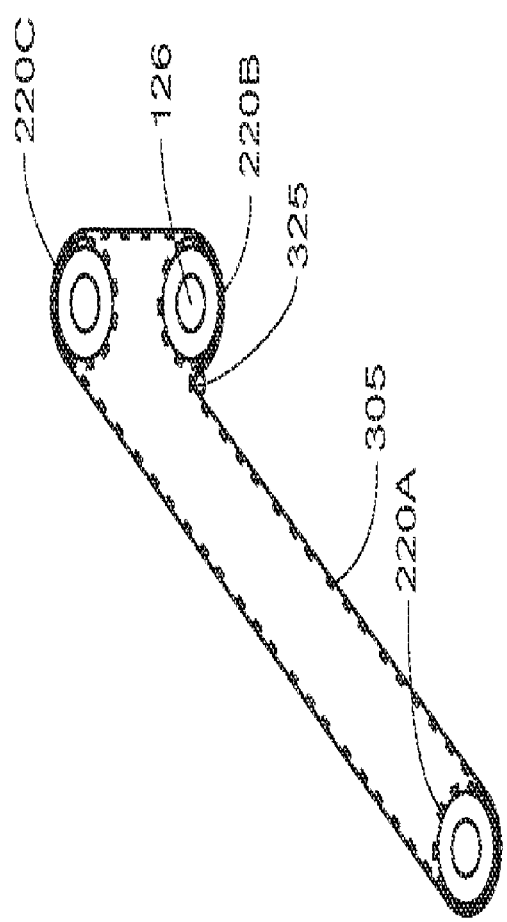
FIG. 3B is an illustrative diagram of one embodiment of how the drive belt circulates through a straight body tube.

Turning now to FIG. 3B, an embodiment of the circulation of the drive belt 305 within the straight body tube 128B (not shown) and the head tube 104 (not shown) is shown. As shown, the drive belt 305 circulates around the drive belt sprocket 220A, a redirect belt sprocket 220C, the drive belt sprocket 220B, and a belt pulley 325.

The driven belt sprocket 220B rotates about the axis 126 in both FIGS. 3A and 3B. The belt pulleys 325 shown in FIGS. 3A and 3B may advantageously redirect the drive belt 305 around possible sharp edges within the frame 102.

Figure 4A:
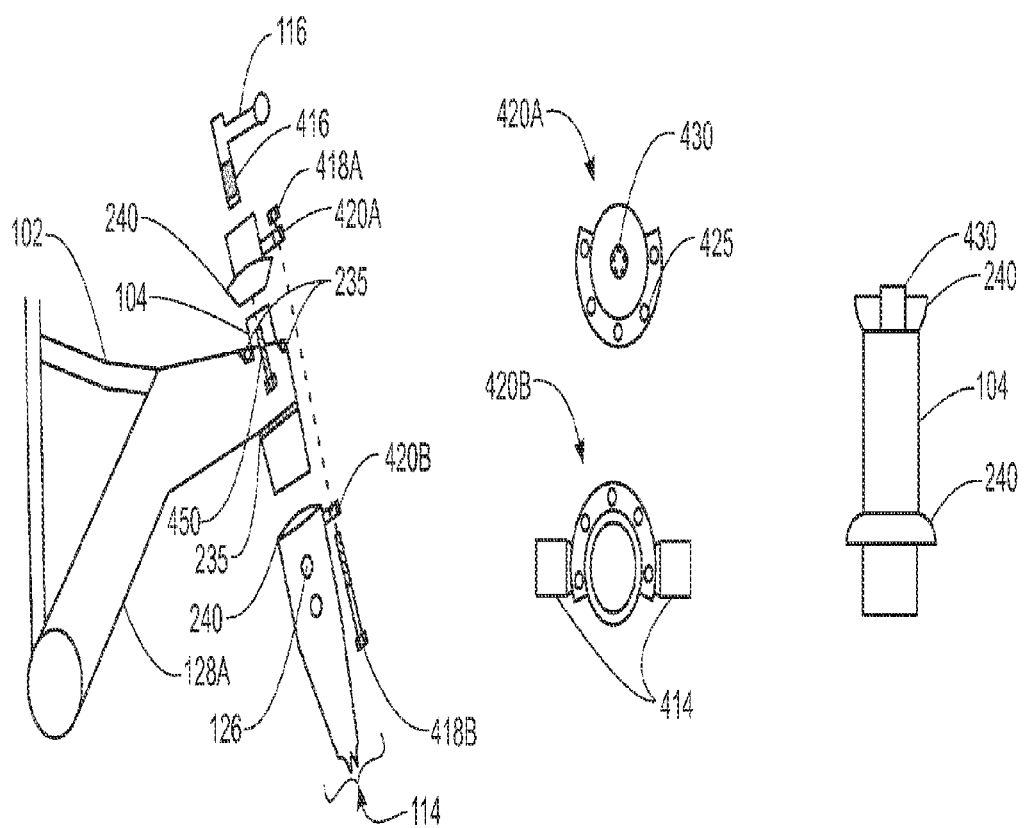
FIG. 4A is a block diagram showing an exploded view of an embodiment of the connection between the head tube and the front fork.

Turning now to FIG. 4A, an exploded view of one embodiment of the connection between the head tube 104 and the front fork 114 is shown. Handle bars 116 with splines 416 join upper steering bracket 420A at head post opening 430. The handle bars 116 are fixed to the front fork 114 using screw 450. The bearing cup 240 fits over the top of the head tube 104 and over the bearings 235. At the lower part of the head tube 104, a lower steering bracket 240B also fits over the head tube 104. The lower steering bracket 240B also includes a bearing cup 240, which fits over bearings 235. As shown, a plurality of nuts 418A and bolts 418B strongly join the upper and lower steering brackets 240A and 240B. The bolts 418B pass through guide holes 425.

Blades 414, of the front fork 114, extend down below the lower steering bracket 420B. Note that the transfer belt 515 is preferably enclosed within one of the blades 414.

Figure 4B:
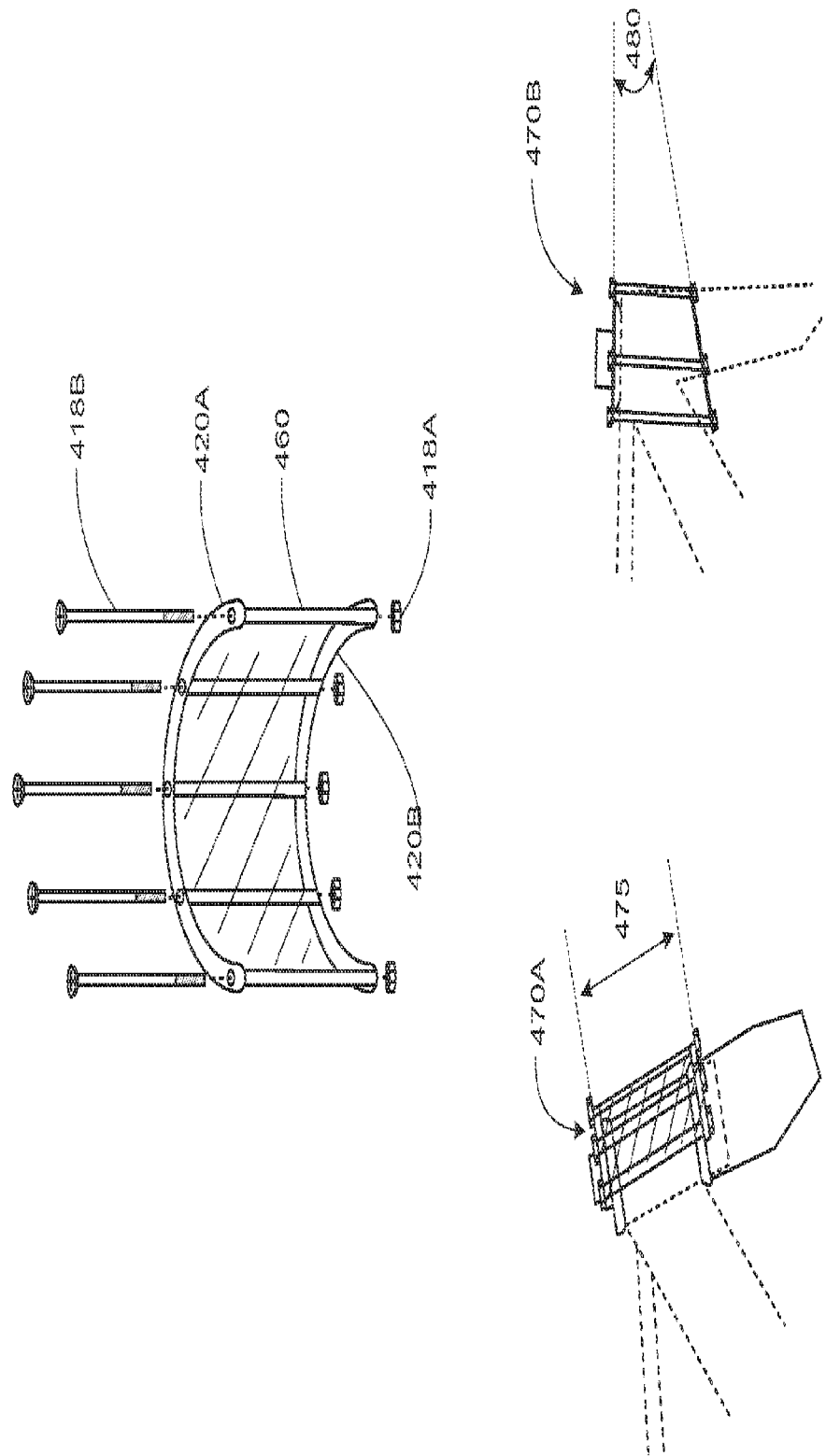
FIG. 4B is an illustrative diagram of embodiments of steering brackets.

In FIG. 4B, various embodiments of the steering brackets 420 are shown. Illustrated embodiments include a plurality of guides 460 that may enclose the bolts 418B and separate the upper steering bracket 420A from the lower steering bracket 420B by the length of each guide 460. As shown, bracket pairs 470 include uniform length guides 460 with a separation distance 475 when installed. Also as shown, bracket pairs 470B include varying length guides 460 and curved brackets 420A and 420B such that an extended angle 480 is made between the brackets 420A and 420B when installed. With varying length guides 460, one of skill in the art could use varying length bolts 418B.

Turning now to FIG. 5, one embodiment of the front wheel drive system is illustrated. The drive belt 305 is shown between the redirect belt sprocket 220C and the driven belt sprocket 220B. The swivel drive shaft 510 operably and rotationally connects the driven belt sprocket 220B with an upper transfer belt sprocket 525A. The swivel drive shaft 510 is slidably connected 520A to the upper transfer belt sprocket 525A to allow for motion induced by turning the handle bars 116 and the front fork 114.

The transfer belt 515 circulates between the upper transfer belt sprocket 525A and the lower transfer belt sprocket 525B. The lower transfer belt sprocket 525B is operably connected to the transfer chain sprocket 530 through a slidable connection 520B, similar to the connection 520A. The slideable connection 520B allows for motion of the transfer chain sprocket 515 when acted upon by the derailleur mechanisms 122 and/or 124 during gear changes, as is known in the art. The chain 540 circulates between the transfer chain sprocket 515 and the front wheel sprocket 535. The front wheel sprocket 535 rotates about the front axle 545 and is coupled to the front rim 550 through a drivable wheel hub (not shown), as is known in the art. Although the right blade 414 is shown as enclosing the transfer belt 515, the left blade 414 may also be used.

Figure 6:
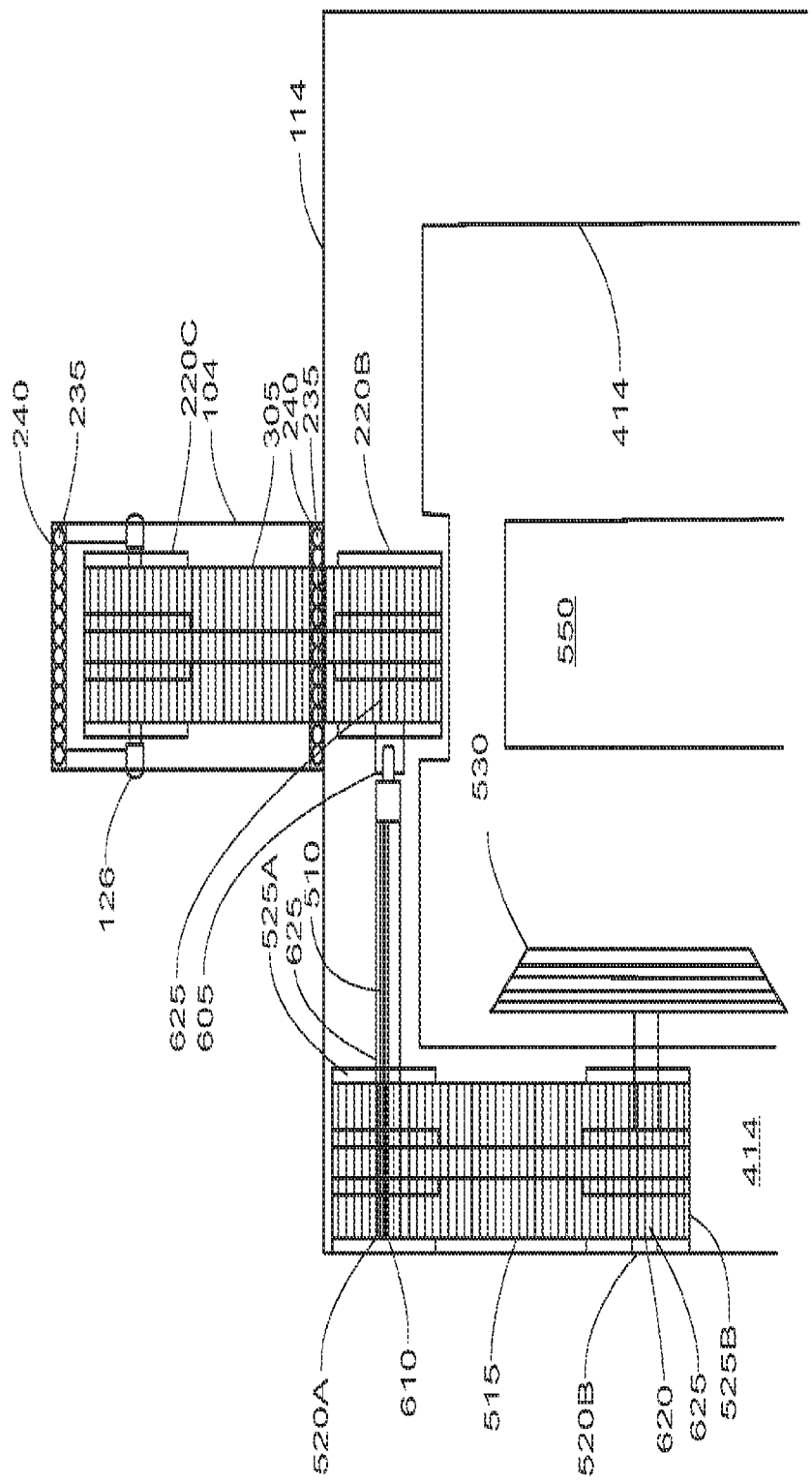
FIGS. 6 and 7 are illustrative embodiments of how the swivel drive shaft connection between the drive belt and the transfer belt fits into the front wheel drive of the bicycle, according to various embodiments of the present invention.
Figure 7:
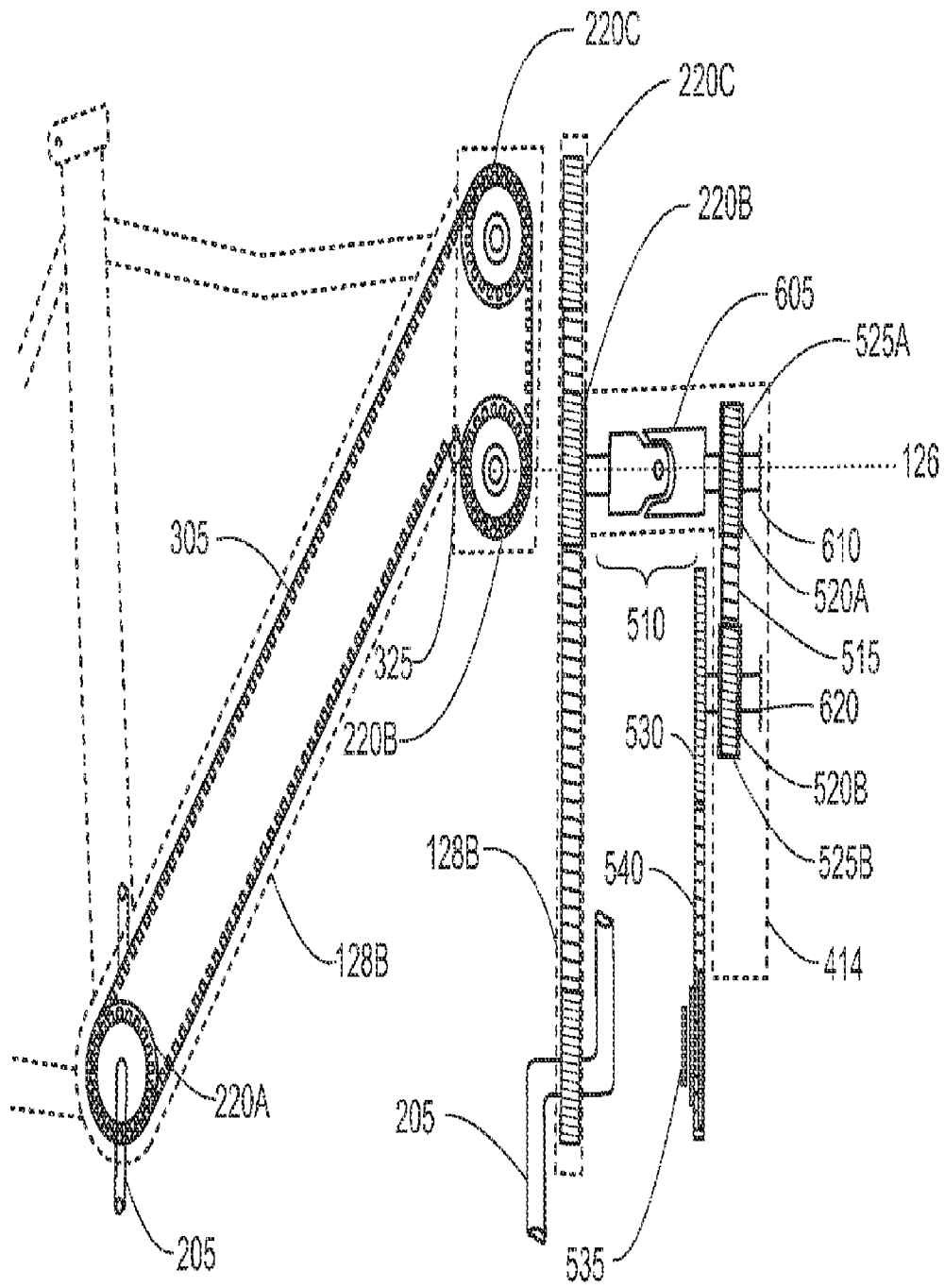

Turning now to FIGS. 6 and 7, details of the embodiment shown in FIGS. 4 and 5 are illustrated. The bearing cup 240 is shown over the bearings 235 at the top of FIG. 6 where the upper steering bracket 420A (not shown) joins the upper part of the front fork 114 with the head tube 104.

A universal joint 605, sometimes referred to as a cardan joint, with internal splines 625 for connecting to the lower transfer belt sprocket 525B provides pivoting motion for the swivel drive shaft 510. Splines 625 at the other end of the swivel drive shaft allows translational motion at sliding connection 520A through the upper transfer belt sprocket 525A with a stop 610 at the end to prevent the swivel drive shaft 510 from pulling out of the upper transfer belt sprocket 525A during turns.

Similarly, a stop 620 is shown at the end of the lower transfer belt sprocket 525B to prevent the pulling out of the axle at sliding connection 520B. Note that the driven belt sprocket 220B is preferably held in place by screws through a bracket with integrated bearings (not shown). The bracket may be placed opposite the swivel drive shaft 510.

Figure 8:
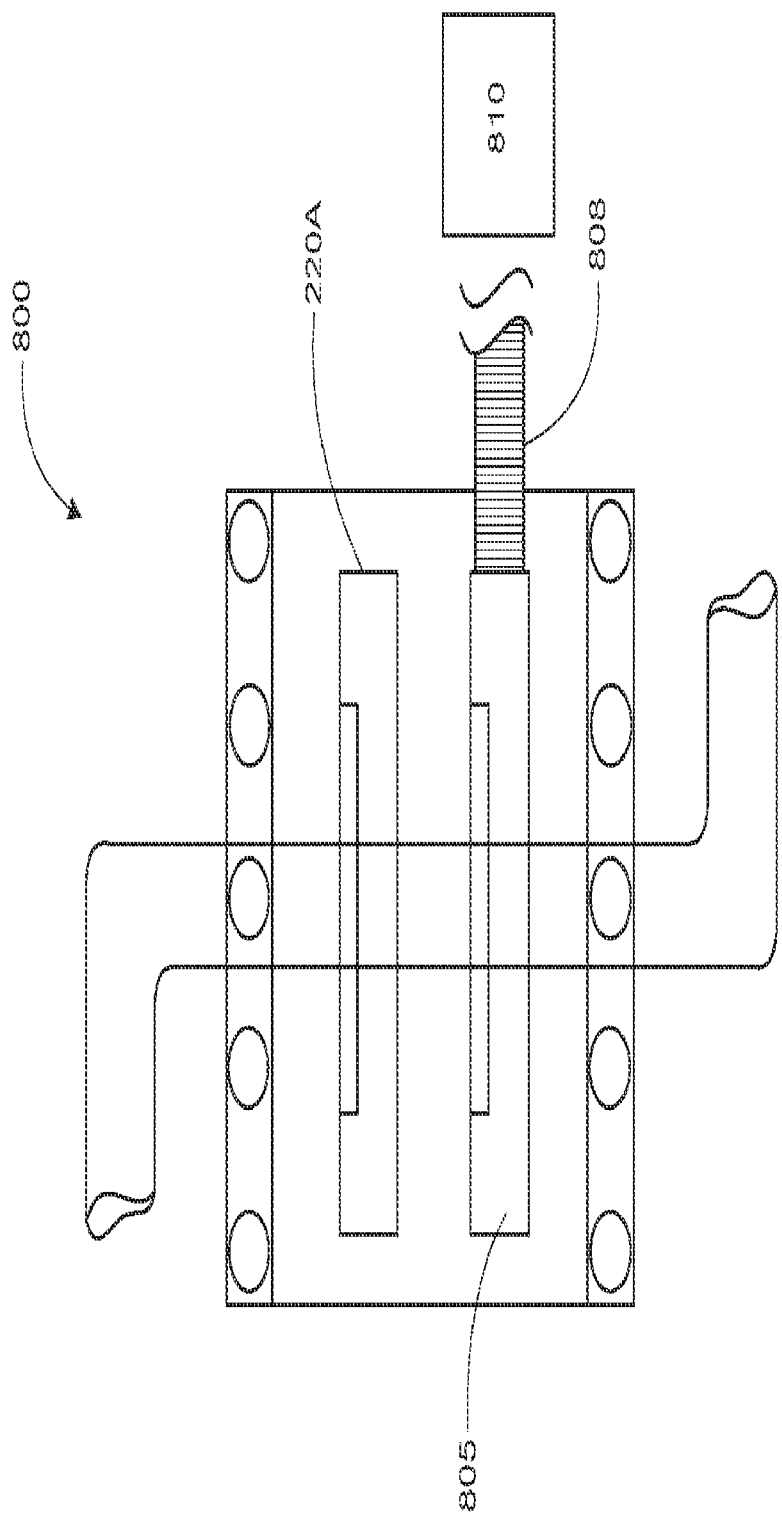
FIG. 8 is an illustrative embodiment of a dual-drive system where a motor provides power.

Turning now to FIG. 8, a dual drive embodiment of FIG. 2B is shown. Along with drive belt sprocket 220A, a motor driven belt sprocket 805 is turned by a belt 808 driven by a motor 810. As mopeds are known in the appropriate art, one of skill in the moped art will understand that the motor 810 may be mounted on the frame 102 rearward of the seat 116. The motor can provide all of the power for the front wheel 110, or a clutching mechanism (not shown), known in the art, can allow for pedaling along with motor. One of skill in the art will appreciate that in various embodiments, the pedals may also be completely replaced by the motor, so that the motor driven belt sprocket 805 can drive the drive belt 305. In one embodiment the motor 810 is mounted on the side of the vehicle where the pedals 120 and crank arms 205 are shown in various drawings, with the motor 810 turning the shaft of the illustrated crank arms 205. Thus, one of skill in the art having the benefit of this disclosure will see that the pedals 120 and crank arms 205 could be substituted for in the drive mechanism 112 by an appropriately sized motor, converting the front wheel drive bicycle 100 of the present invention into a motor scooter.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, shall refer to this application as a whole and not to any particular portions of this application. When the word "or" is used in reference to a list of two or more items, that word covers all of the following interpretations of the word: any of the items in the list, all of the items in the list and any combination of the items in the list.

Numerous variations and modifications will become apparent to those skilled in the art once the above disclosure is fully appreciated. It is intended that the following claims be interpreted to embrace all such variations and modifications.

I claim:

1. A vehicle, comprising:
   a front fork operable for steering the vehicle by moving a front wheel;
   a frame to which the front fork and a back wheel are operably coupled, wherein the front fork couples to a fixed head tube of the frame;
   a crank for providing power to the front wheel, wherein the crank is positioned between the front wheel and the back wheel, wherein a movable linkage conveying the power to the front wheel is at least partially enclosed within the frame between the crank and the front wheel; and
   a steering mechanism, wherein the front fork rigidly couples to the steering mechanism without passing through the fixed head tube.

2. The vehicle of claim 1, wherein the front fork includes a rigid connector that at least partly surrounds the fixed head tube.

3. The vehicle of claim 2, wherein the rigid connector comprises a plurality of fasteners passing through holes in a plurality of plates.

4. The vehicle of claim 3, wherein each of the plurality of plates is curved to match an external profile of the fixed head tube.

5. The vehicle of claim 4, wherein various ones of the plurality of fasteners vary in length.

6. The vehicle of claim 1, wherein the movable linkage includes a plurality of movable linkages in series.

7. The vehicle of claim 6, wherein the plurality of movable linkages includes one or more belts and a chain, wherein at least one belt is enclosed within the frame.

8. The vehicle of claim 6, wherein the plurality of movable linkages includes one or more belts and a chain, wherein at least one belt is enclosed within the front fork.

9. The vehicle of claim 6, wherein the plurality of movable linkages includes one or more belts in series with one or more chains.

10. The vehicle of claim 1, wherein the fixed head tube divides the front fork above the front wheel.

11. The vehicle of claim 1, wherein the front fork partially encloses the fixed head tube.

12. The vehicle of claim 1, further comprising:
    a motor coupled to the crank, wherein the vehicle is a motorized scooter.

13. A method of operating a vehicle, the method comprising:
    providing power to a crank operably coupled to a front wheel, wherein the crank is positioned between the front wheel and a back wheel;
    transferring the power through a moving linkage to the front wheel, wherein the moving linkage is at least partially enclosed within a frame between the crank and the front wheel, wherein the moving linkage is enclosed within a fixed head tube of the frame; and
    steering the vehicle through a front fork that moves the front wheel, wherein the front fork passes around the fixed head tube above the front wheel.

14. The method of claim 13, wherein said steering the vehicle through the front fork that moves the front wheel, wherein the front fork passes around the fixed head tube above the front wheel comprises steering the vehicle through the front fork that moves the front wheel, wherein the front fork is connected around the fixed head tube with a plurality of connectors passing through holes in a plurality of plates.

15. The method of claim 13, wherein said steering the vehicle through the front fork that moves the front wheel, wherein the front fork passes around the fixed head tube above the front wheel comprises steering the vehicle through the front fork that moves the front wheel, wherein the front fork is connected around the fixed head tube with a plurality of connectors passing through holes in a plurality of curved plates.

16. The method of claim 13, wherein said transferring the power through the moving linkage to the front wheel, wherein the moving linkage is at least partially enclosed within the frame between the crank and the front wheel, wherein the moving linkage is enclosed within the fixed head tube of the frame comprises transferring the power through a plurality of moving linkage in series to the front wheel, wherein at least one of the plurality of moving linkages is at least partially enclosed within the frame between the crank and the front wheel, and wherein at least one of the plurality of moving linkages is enclosed within the fixed head tube of the frame.

17. The method of claim 16, wherein said transferring the power through the plurality of moving linkage in series to the front wheel, wherein at least one of the plurality of moving linkages is at least partially enclosed within the frame between the crank and the front wheel, and wherein at least one of the plurality of moving linkages is enclosed within the fixed head tube of the frame comprises transferring the power through one or more belts and a chain in series to the front wheel, wherein one belt is enclosed within the frame between the crank and the front wheel, and wherein one belt is enclosed within the fixed head tube of the frame.

18. The method of claim 13, wherein said providing power to a crank operably coupled to the front wheel comprises operating a motor operably coupled to the crank, wherein the vehicle is a motorized scooter.

19. A bicycle, comprising:
a front wheel and a back wheel;
a frame, including a fixed head tube, to which the front wheel and the back wheel are operably coupled;
a crank for providing power to the front wheel, wherein the crank is positioned between the front wheel and the back wheel, wherein a plurality of movable linkages convey the power to the front wheel, and wherein one of the plurality of linkages is enclosed within the frame between the crank and the front wheel, wherein one of the plurality of linkages is enclosed within a front fork operable for steering the vehicle by moving the front wheel, wherein the front fork connects the frame and the front wheel, wherein the front fork passes around the fixed head tube, wherein the front fork is mounted to the fixed head tube using at least one connector joining a plurality of plates.

* * * * *